(12) United States Patent
Furuta et al.

(10) Patent No.: US 10,981,211 B2
(45) Date of Patent: Apr. 20, 2021

(54) PROCESSING DEVICE AND PROCESSING METHOD

(71) Applicant: MITSUI HIGH-TEC, INC., Fukuoka (JP)

(72) Inventors: Masahiko Furuta, Fukuoka (JP); Kazufumi Yonemura, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 262 days.

(21) Appl. No.: 16/038,282

(22) Filed: Jul. 18, 2018

(65) Prior Publication Data

US 2018/0318906 A1 Nov. 8, 2018

Related U.S. Application Data

(63) Continuation of application No. 14/352,201, filed as application No. PCT/JP2012/078981 on Nov. 8, 2012, now Pat. No. 10,058,908.

(30) Foreign Application Priority Data

Nov. 22, 2011 (JP) .................................. 2011-255296

(51) Int. Cl.
 B21D 28/06 (2006.01)
 B21D 43/00 (2006.01)
 (Continued)

(52) U.S. Cl.
 CPC .............. B21D 45/04 (2013.01); B21D 22/06 (2013.01); B21D 28/02 (2013.01); B21D 28/06 (2013.01);
 (Continued)

(58) Field of Classification Search
 CPC ........ B21D 28/02; B21D 28/04; B21D 28/06; B21D 28/10; B21D 28/26; B21D 35/001;
 (Continued)

(56) References Cited

U.S. PATENT DOCUMENTS 3,602,079 A 8/1971 Carlson
2004/0250585 A1 12/2004 Bennett et al.
(Continued)

FOREIGN PATENT DOCUMENTS

CN 102218468 10/2011
JP 61-27520 2/1986
(Continued)

OTHER PUBLICATIONS

International Search Report and Written Opinion in PCT/JP2012/078981, dated Feb. 12, 2013, along with an English translation of the Search Report.

(Continued)

*Primary Examiner* — Gregory D Swiatocha
(74) *Attorney, Agent, or Firm* — Greenblum & Bernstein, P.L.C.

(57) ABSTRACT

A processing device is provided which feeds a long plate body from an upstream side to a downstream side and sequentially carries out a press work including a blanking work to the long plate body. The processing device includes a plurality of stages provided along a feed direction of the long plate body, which has a die that applies the press work to the long plate body and a plurality of lifters provided along the feed direction of the long plate body which have lift-up parts that lift up the long plate body from the die. In the plurality of lifters, clearances by the lift-up parts of the lifters arranged in the downstream side are set to be larger than the clearances by the lift-up parts of the lifters arranged in the upstream side.

10 Claims, 2 Drawing Sheets

(51) Int. Cl.
*B21D 45/04* (2006.01)
*H02K 15/02* (2006.01)
*B21D 22/06* (2006.01)
*B21D 28/02* (2006.01)
*B21D 45/00* (2006.01)
*H01F 41/02* (2006.01)
*B21D 35/00* (2006.01)

(52) U.S. Cl.
CPC ......... *B21D 43/003* (2013.01); *H02K 15/024* (2013.01); *B21D 35/001* (2013.01); *B21D 45/003* (2013.01); *H01F 41/02* (2013.01)

(58) Field of Classification Search
CPC .... B21D 22/06; B21D 43/003; H02K 15/024; H01F 41/02
See application file for complete search history.

(56) References Cited

U.S. PATENT DOCUMENTS

| | | |
|---|---|---|
| 2011/0236162 A1 | 9/2011 | Shikayama et al. |
| 2011/0252938 A1 | 10/2011 | Hirata |
| 2012/0279369 A1 | 11/2012 | Kimura et al. |

FOREIGN PATENT DOCUMENTS

| | | |
|---|---|---|
| JP | 4-075728 | 3/1992 |
| JP | 11-104897 | 4/1999 |
| JP | 2001-204784 | 7/2001 |
| JP | 2003-200296 | 7/2003 |
| JP | 3777435 | 5/2006 |
| TW | 201139006 | 11/2011 |

OTHER PUBLICATIONS

China Office action, dated Jan. 23, 2015 along with an English translation thereof.
Search report from E.P.O., dated Jun. 26, 2015.
Office Action issued in China Counterpart Patent Appl. No. 201280057487.6, dated Aug. 7, 2015, along with an English translation thereof.
Office Action issued in Japan Counterpart Patent Appl. No. 2011-255296, dated Nov. 4, 2015, along with an English translation thereof.
Human translation of JP 2003-200296, Translated Apr. 2017, 39 Pages.
Human translation of JP 04-0757528, Translated Mar. 2017, 39 Pages.

PROCESSING DEVICE AND PROCESSING METHOD

CROSS REFERENCE TO RELATED APPLICATION

This application is a continuation application of U.S. application Ser. No. 14/352,201, filed on Apr. 16, 2014, which is a National Stage Application of International Application No. PCT/JP2012/078981, filed on Nov. 8, 2012, which claims the benefit of Japanese Application No. 2011-255296, filed Nov. 22, 2011, the entire contents of which are hereby incorporated by reference.

TECHNICAL FIELD

The present invention relates to a processing device and a processing method in which a work including a blanking work is applied to a sheet member by using a die having an upper die and a lower die.

BACKGROUND ART

In a processing device which sequentially conveys a sheet member from an upstream side to a downstream side and processes the sheet member, as disclosed in Patent Literature 1, a processing device is proposed which has mechanical lifters or air lifters respectively provided in stages. In the processing device of Patent Literature 1, the lifters are respectively provided in the stages. In this processing device, protruding heights of the lifters in their free states are the same. Spaces between the lifters adjacent in an advancing direction are the same. Further, widths of the lifters respectively provided in the stages are the same.

CITATION LIST

Patent Literature

Patent Literature 1: JP-A-11-104897

SUMMARY OF INVENTION

Technical Problem

However, as a blanking work is sequentially applied more to a wide sheet member, a rigidity of the sheet member is the more reduced. Accordingly, as the sheet member is conveyed to a more downstream stage, the sheet member is the more liable to be bent. Thus, the sheet member may be possibly caught in the processing device so that the sheet member is deformed. As a result, the processing device may be probably broken.

Thus, the present invention provides a processing device and a processing method which has no fear of damage due to a cause that the sheet member is caught in the processing device.

Solution to Problem

A processing device according to the present invention is a processing device for feeding a long plate body from an upstream side to a downstream side and sequentially carrying out a press work including a blanking work to the long plate body, the processing device including: a plurality of stages provided along a feed direction of the long plate body, wherein the plurality of stages has a die that applies the press work to the long plate body at the plurality of stages; and a plurality of lifters provided along the feed direction of the long plate body, wherein the plurality of lifters have lift-up parts that separate the long plate body by a prescribed clearance from the die, wherein the plurality of lifters are so configured that the clearance by the lift-up part of a lifter arranged in the downstream side is set to be larger than the clearances by the lift-up part of a lifter arranged in the upstream side.

The processing device may be configured so that a number of lift-up parts of the lifter arranged in the downstream side is larger than a number of lift-up parts of the lifter arranged in the upstream side.

The processing device may be configured so that the lift-up parts of the lifters are arranged in a width direction of the long plate body, and a width of the lift-up parts of the lifter arranged in the downstream side is set to be larger than a width of the lift-up parts of the lifter arranged in the upstream side.

The processing device may be configured so that two or more lift-up parts are provided along a width direction of the long plate body.

A processing method according to the present invention is a processing method for feeding a long plate body from an upstream side to a downstream side and sequentially carrying out a press work including a blanking work to the long plate body, wherein the long plate body fed to stages which respectively process the long plate body is lifted higher in the more downstream side by lifters respectively provided in the stages.

In the processing device and the processing method according to the present invention, there is no fear that the processing device may be possibly broken due to a cause that the long plate body is caught in the processing device when the long plate body is conveyed by the lifters.

DESCRIPTION OF EMBODIMENTS

Referring to FIG. 1 to FIG. 4, a processing device according to an embodiment of the present invention will be described.

Figure 1:
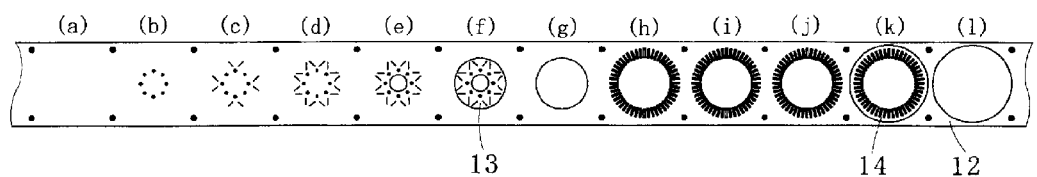
FIG. 1 is a plan view showing a processed state of a long plate body to which a processing device according to an embodiment of the present invention is applied.
Figure 2:
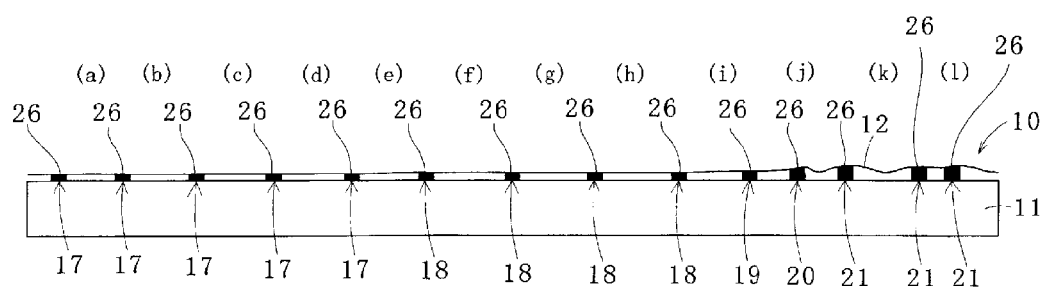
FIG. 2 is a sectional view of the long plate body and the processing device in process.
Figure 3:
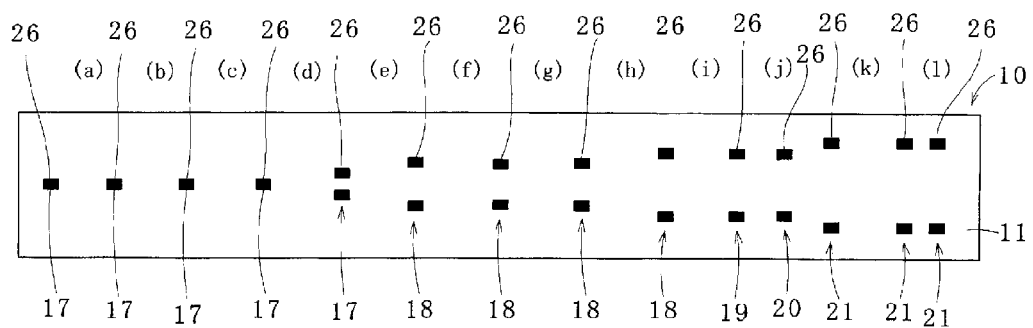
FIG. 3 is a plan view of a lower die corresponding to FIG. 2.
Figure 4:
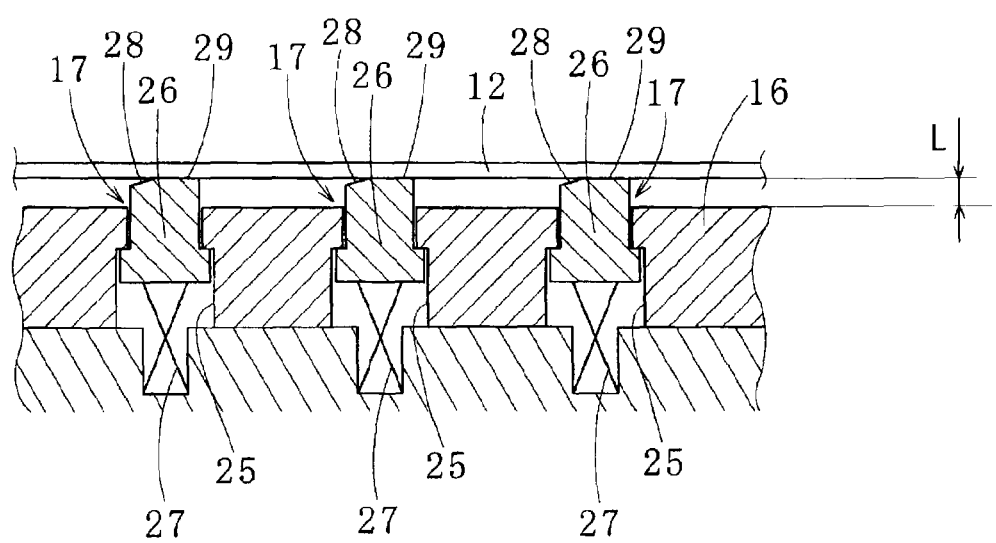
FIG. 4 is an enlarged view in section of peripheries of lifters of the processing device.

FIG. 1 is a plan view showing a processed state of a long plate body to which a processing device according to an embodiment is applied. FIG. 2 is a sectional view of the long plate body and the processing device in process. FIG. 3 is a plan view of a state corresponding to FIG. 2. FIG. 4 is an enlarged view in section of peripheries of lifters of the processing device.

A processing device 10 according to the present embodiment is a device of manufacturing a laminated iron core which can be preferably suitably used as a core or a stator of a motor. The laminated iron core is obtained by blanking a long electromagnetic steel plate (a long plate body) in a desired form.

As shown in FIG. 1 to FIG. 4, the processing device 10 according to the present embodiment includes a plurality of stages (a) to (l) having a common lower die (a die) 11 and upper dies arranged thereon which is not shown in the drawing. The plurality of stages (a) to (l) is arranged along a feed direction (a direction toward the right from the left in FIGS. 1 to 3) of a sheet member 12 as an object to be processed. In FIG. 1, signs (a) to (l) respectively show areas mounted on the stages (a) to (l). In FIGS. 2 and 3, sings (a) to (l) respectively show areas of the stages (a) to (l).

In the processing device 10, the sheet member 12 made of a long electromagnetic steel plate is sequentially conveyed respectively to the stages (a) to (l). Initially, in the stages (a) to (e), an unnecessary part is stepwise blanked to a prescribed form and a rotor iron core piece 13 is separated from the sheet member 12 in the stage (f). Thus, the rotor iron core piece 13 is obtained.

Further, the sheet member 12 from which the rotor iron core piece 13 is separated is subsequently conveyed to a downstream side to blank an unnecessary part to a prescribed form in the stages (h) to (k). In the stage (l) located in the most downstream side, a stator iron core piece 14 is separated from the sheet member 12. When the processing device 10 is used, the rotor iron core piece 13 and the stator iron core piece 14 are manufactured in such a way as described above.

The lower die 11 has a die not shown in the drawing and a die plate 16 (see FIG. 4).

In the die plate 16, a plurality of lifters 17 to 21 shown in FIG. 1 to FIG. 3 are respectively provided.

The lifters 17 to 21 are respectively provided in positions nearer to the stage (a) and in boundary positions of the stages (a) to (l). Further, the lifter 20 is provided in a central position of the stage (j) in the feed direction and the lifter 21 is provided in a central position of the stage (l) in the feed direction.

As shown in FIG. 4, the lifter 17 has a lifter pin (a lift-up part) 26 which moves upward and downward in a through-hole 25 provided in the die plate 16 and a spring 27.

The lifter pin 26 is a member which comes into contact with the sheet member 12 to apply such a force for lifting the sheet member 12 from the die plate 16. The spring 27 applies an upward force to the lifter pin 26 so that an upper surface of the lifter pin 26 may be lifted up to a prescribed height which protrudes from an upper surface of the die plate 16. Since the lifters 18 to 21 have the structures similar to the structure of the lifter 17, a detailed description thereof will be omitted.

The lifter pin 26 is pressed by a stripper and lowered as the upper die is lowered. When a prescribed part is blanked out from the sheet member 12 by the upper die and the lower die 11, the lifter pin 26 does not protrude from the upper surface of the die plate 16.

Further, the lifter pin 26 is lifted by a resilient force of the spring 27 as the upper die is lifted up, and protrudes from the upper surface of the die plate 16. Thus, after a blanking work of the sheet member 12 is finished respectively by the stages (a) to (l), the sheet member 12 is lifted up by the lifter pins 26 and separated upward from the die plate 16. Under this state, the sheet member 12 is conveyed to a downstream side by a conveyor not shown in the drawing.

In a top part of the lifter pin 26, an inclined surface 28 is provided which is inclined downward in an upstream side. In the downstream side of the inclined surface 28, a horizontal surface 29 is formed. Naturally, one or both of the inclined surface 28 and the horizontal surface 29 may be omitted. Alternatively, the top part of the lifter pin 26 may be configured in a circular arc form in section.

As shown in FIG. 3, the lifters 17 to 21 are respectively provided in the positions nearer to the stage (a) and in the boundary positions of the stages (a) to (l). In the present embodiment, a clearance L of the lifter 17 from the lower die 11 formed by the lifter pin 26 is set to 6 mm. A clearance L of the lifter 18 from the lower die 11 formed by the lifter pin 26 is set to 7 mm. A clearance L of the lifter 19 from the lower die 11 formed by the lifter pin 26 is set to 8 mm. A clearance L of the lifter 20 from the lower die 11 formed by the lifter pin 26 is set to 10 mm. A clearance L of the lifter 21 from the lower die 11 formed by the lifter pin 26 is set to 13 mm.

As described above, in the processing device 10 according to the present embodiment, the clearance L of the sheet member 12 from the die plate 16 formed by the lifter pin 26 of the lifter in a downstream side is set to be the same as or larger than the clearance L by the lifer pin 26 of the lifter in its upstream side.

The lifter pins 26 of the lifters 17 located in the positions nearer to the stage (a) and in the boundary positions of the stages (a) to (d)) are provided one by one at central positions in a direction of width of the lower die 11 (the die plate 16).

In the lifters 17 to 21 provided in the downstream side of the lifters 17 which include the lifter 17 provided in the boundary position of the stages (d) and (e), the two lifter pins 26 are respectively provided which are arranged in the width direction of the sheet member 12 (the direction which intersects at right angles to the feed direction).

The sheet member 12 is allowed to sequentially pass the stages (a) to (l) respectively by using the processing device 10 formed as described above, and the blanking work is applied to the sheet member 12 respectively in the stages (a) to (l). Every time that the sheet member 12 is blanked, a rigidity of the sheet member 12 is gradually reduced.

In the stages (a) to (d), a prescribed part is blanked from the sheet member 12 to form slots. However, the rigidity of the sheet member 12 is not much reduced. Accordingly, even by the lifter 17 which has only one lifter pin 26 in the width direction, both ends of the sheet member 12 in the width direction do not come into contact with the die plate 16, so that the sheet member 12 can be lifted up.

Then, in the stage (e), a part for a shaft hole of the rotor iron core piece 13 is blanked from the sheet member 12. Further, after the stage (0, the rotor iron core piece 13 is blanked. Thus, the rigidity of the sheet member 12 is gradually reduced. Accordingly, when the sheet member 12 is lifted, the sheet member 12 is liable to be bent. Then, as shown in FIG. 2, the end parts of the sheet member 12 in the width direction or a part between the lifter 20 in the upstream side and the lifter 21 in the downstream side may be possibly bent downward.

Even when the sheet member 12 is bent in such a way as described above, in the processing device 10 and a processing method according to the present embodiment, the clearances by the lifters 17 to 21 by the lifter pins 26 are set so as to be larger toward the downstream side. Thus, even when the sheet member 12 is bent downward in the downstream side, the sheet member 12 is lifted up higher by the lifters 17 to 21 respectively provided in the stages as the sheet member is fed the more to the downstream side. Thus, the sheet member 12 can be restrained from coming into contact with the die plate 16. Accordingly, when the sheet member 12 is lifted up by the lifters 17 to 21 and fed to the downstream side, the sheet member 12 can be restrained from being caught in or coming into contact with the processing device 10 including the lower die 11 or the lifter pins 26. The processing device 10 can be prevented from being broken.

Further, in the processing device 10 according to the present embodiment, the number of the lifter pins 26 of the lifters arranged in the downstream side is set to be larger than the number of the lifter pins 26 of the lifters arranged in the upstream side. Thus, as the sheet member is fed more to the downstream side, the sheet member 12 is supported the more by many support points, a bending is the more suppressed and the sheet member 12 can be the more assuredly prevented from coming into contact with the processing device 10.

In the lifters 17 to 21 which respectively have the two lifter pins 26 provided and arranged in the width direction of the sheet member 12 in the processing device 10 according to the present embodiment, a width of the lifter pins 26 of the lifter arranged in the downstream side is set to be larger than a width of the lifter pins 26 of the lifter arrange din the upstream side. Thus, even when the sheet member 12 fed to the downstream side is bent, the end parts thereof in the width direction can be prevented from coming into contact with the die plate 16.

Further, since the plurality of lifter pins 26 are provided, the lifter can support the sheet member 12 by the plurality of support points. Thus, the sheet member 12 does not come into contact with the die plate 16 and can be assuredly lifted up, so that the processing device 10 can be prevented from being broken.

The present invention is not limited to the above-described embodiment, and the structure thereof may be changed within a scope that does not change the gist of the present invention. For instance, the heights, the number, the widths and the spaces of the lifter pins are not limited to the above described numeric values, and may be changed depending on the form or size of the sheet member to be processed.

Further, in the above-described embodiment, both the rotor iron core piece and the stator iron core piece are blanked and formed from the sheet member. However, the present invention may be applied to a case that only one of them is formed. Further, in the stages of the downstream side, one or two or more lifter pins may be provided between the lifter pins arranged in the width direction of the sheet member.

In the above-described embodiment, an example is exemplified and described in which one lower die 11 is used in common respectively by the stages (a) to (l). However, the present invention is not limited to this example. The present invention may be applied to a case where an upper die and a lower die are provided in each of stages or to a processing device having a lower die or an upper die shared by a plurality of stages.

Further, in the above-described embodiment, an example is exemplified and described in which the lifters 17 to 21 are provided respectively in the upstream side and the downstream side of the stages (a) to (l). However, the present invention is not limited thereto. For instance, when the rigidity of the sheet member is high to some degree, stages which are not provided with the lifters 17 to 21 may be provided.

Further, in the above-described embodiment, the lifters 17 to 21 are exemplified and described which physically come into contact with the sheet member 12 to lift the sheet member. However, the present invention may be applied to a processing device provided with what is called an air lifter (a lift-up part) which blows gas to a sheet member to lift up the sheet member from a lower die 11.

Further, in the above-described embodiment, although the processing device 10 in which the blanking work is carried out in all the stages is described as an example, the present invention is not limited thereto. The present invention may be applied to a processing device which can carry out a press work such as a punching work or a bending work as well as the blanking work.

In the above-described embodiment, as the processing device 10, the device of manufacturing the laminated iron core is described as an example. The present invention is not limited thereto. For instance, the processing device may be applied to a device of blanking a lead frame used for electronic parts or a device of blanking a thin metal plate such as a blanking device for other precision components.

As mentioned above, the present invention is described in detail by referring to the specific embodiment. However, it is to be understood to a person with ordinary skill in the art that various changes or modifications may be made without deviating from the spirit and scope of the present invention.

The present application is based on Japanese Patent Application No. 2011-255296 filed on Nov. 22, 2011, the contents of which are incorporated herein by reference.

INDUSTRIAL APPLICABILITY

According to an aspect of the present invention, the processing device and the processing method can be provided in which when the long plate body is conveyed by the lifters, the long plate body can be restrained from being caught in the processing device when the long plate body is conveyed by the lifters, so that there is no fear of damage.

REFERENCE SIGNS LIST

10: processing device
11: lower die
12: sheet member
13: rotor iron core piece
14: stator iron core piece
16: die plate
17 to 21: lifter
25: through-hole
26: lifter pin
27: spring
28: inclined surface
29: horizontal surface

What is claimed is:

1. A processing device for feeding a long plate body from an upstream position to a downstream position in a feed direction of the long plate body with respect to a press work position and sequentially carrying out press work including blanking work on the long plate body, the processing device comprising:
    a plurality of stages provided consecutively along the feed direction of the long plate body, wherein the plurality of stages has a die that applies the press work to the long plate body at the plurality of stages; and
    wherein each of the plurality of stages is associated with at least one lifter,
    the at least one lifter associated with each of the plurality of stages together defining a plurality of lifters provided along the feed direction of the long plate body, wherein the plurality of lifters each have a lift-up part that separates the long plate body from the die by a prescribed clearance, wherein the clearance by the lift-up part of each lifter is equal to or larger than the clearance of an adjacent lifter arranged in the upstream position, at least the clearance by the lift-up part of the lifter at a most downstream position is larger than the clearance by the lift-up part of the lifter in a most upstream position, wherein the at least one lifter associated with a final stage of the plurality of stages comprises at least two most downstream lifters that are spaced apart in the feed direction, a clearance of all the lift-up parts of the at least two most downstream lifters, which are positioned to support the long plate body in the final stage, is equal.

2. The processing device according to claim 1, wherein a number of the lifters is equal to or larger than a number of the adjacent lifters arranged in the upstream position and at least the number of the lifter the lifters at the most downstream position is larger than the number of the lifter the lifters in the most upstream position.

3. The processing device according to claim 2, wherein two or more lifters are provided along a width direction of the long plate body that is transverse to the feed direction of the long plate body.

4. The processing device according to claim 1, wherein the plurality of lifters include a plurality of pair of lifters arranged in a width direction of the long plate body that is transverse to the feed direction of the long plate body, and a distance, in the width direction, between one of the plurality of pair of lifters is equal to or larger than a distance, in the width direction, between another adjacent one of the plurality of pair of lifters arranged at the upstream position, and at least a distance, in the width direction, between the pair of lifters at the most downstream position is larger than a distance, in the width direction, between the pair of lifters at the most upstream position.

5. The processing device according to claim 4, wherein at least one lifter is further provided between the pair of lifters.

6. The processing device according to claim 4, wherein the distances, in the width direction, between the lifters increases in a stepwise manner from the upstream position toward the downstream position.

7. The processing device according to claim 1, wherein at least the lifter arranged in the most upstream position has a single lift-up part centrally located in a width direction that is transverse to the feed direction of the long plate body.

8. The processing device according to claim 1, wherein each of the plurality of lifters is provided in a boundary position between the stages.

9. The processing device according to claim 1, wherein the clearance by the lift-up part increases in a stepwise manner from the upstream position toward the downstream position.

10. A processing device for feeding a long plate body from an upstream position to a downstream position in a feed direction of the long plate body with respect to a press work position and sequentially carrying out press work including blanking work on the long plate body, the processing device comprising:

a plurality of stages provided consecutively along the feed direction of the long plate body, wherein the plurality of stages has a die that applies the press work to the long plate body at the plurality of stages; and a plurality of lifters provided along the feed direction of the long plate body, wherein the plurality of lifters each have a lift-up part that separates the long plate body from the die by a prescribed clearance, wherein the clearance by the lift-up part of each lifter is equal to or larger than the clearance of an adjacent lifter arranged in the upstream position, at least the clearance by the lift-up part of the lifter at a most downstream position is larger than the clearance by the lift-up part of the lifter in a most upstream position, the plurality of lifters provided along the feed direction include a plurality of pair of lifters arranged in a width direction of the long plate body that is transverse to the feed direction of the long plate body, and a first distance, in the width direction, between one of the plurality of pair of lifters closest to the upstream side is narrower than a second distance, in the width direction, between another of the plurality of pair of lifters closest to the downstream side.

* * * * *

UNITED STATES PATENT AND TRADEMARK OFFICE
CERTIFICATE OF CORRECTION

PATENT NO. : 10,981,211 B2
APPLICATION NO. : 16/038282
DATED : April 20, 2021
INVENTOR(S) : M. Furuta et al.

It is certified that error appears in the above-identified patent and that said Letters Patent is hereby corrected as shown below:

In the Claims

At Column 7, Line 42 (Claim 6), please change "distances" to -- distance --.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*